United States Patent
Liao et al.

(10) Patent No.: US 6,960,902 B1
(45) Date of Patent: Nov. 1, 2005

(54) CONVERSION CIRCUIT FOR DISCRIMINATING SOURCING CURRENT AND SINKING CURRENT

(75) Inventors: Yu-Fen Liao, Kaohsiung (TW); Cheng-Hsuan Fan, Hsin-Chu (TW)

(73) Assignee: Richtek Technology Corp., Hsinchu Hsien (TW)

( * ) Notice: Subject to any disclaimer, the term of this patent is extended or adjusted under 35 U.S.C. 154(b) by 0 days.

(21) Appl. No.: 10/827,492

(22) Filed: Apr. 20, 2004

(51) Int. Cl.[7] .......................... G05F 1/652; G05F 1/656
(52) U.S. Cl. ....................... 323/222; 323/224; 323/284
(58) Field of Search ............................... 323/222, 224, 323/282, 285, 284

(56) References Cited

U.S. PATENT DOCUMENTS

| | | | | |
|---|---|---|---|---|
| 5,747,977 A | * | 5/1998 | Hwang | 323/284 |
| 5,867,379 A | * | 2/1999 | Maksimovic et al. | 363/89 |
| 6,326,774 B1 | * | 12/2001 | Mueller et al. | 323/222 |
| 6,348,780 B1 | * | 2/2002 | Grant | 323/222 |
| 6,600,670 B2 | * | 7/2003 | Morita et al. | 363/89 |
| 6,657,417 B1 | * | 12/2003 | Hwang | 323/222 |
| 6,737,845 B2 | * | 5/2004 | Hwang | 323/284 |
| 6,903,535 B2 | * | 6/2005 | Liu et al. | 323/222 |

* cited by examiner

Primary Examiner—Bao Q. Vu
(74) Attorney, Agent, or Firm—Birch Stewart Kolasch & Birch LLP

(57) ABSTRACT

A conversion circuit for discriminating sourcing current and sinking current utilizes a complementary switch circuit to change the serial loop connected with the output load according to ON/OFF signals, so as to correspond to a sourcing current output and a sinking current output. The conversion circuit also employs a voltage emulation circuit to shift the feedback voltage of both sourcing and sinking current to a suitable positive range, so as to omit a negative power source design. The conversion circuit utilizes a switch control logic circuit to timely blank the partial compared result of the feedback voltage of sinking current to generate correct ON/OFF signals.

18 Claims, 4 Drawing Sheets

CONVERSION CIRCUIT FOR DISCRIMINATING SOURCING CURRENT AND SINKING CURRENT

BACKGROUND OF THE INVENTION

1. Field of the Invention

This invention generally relates to a conversion circuit, and more particularly, to a conversion circuit that discriminates sourcing current and sinking current.

2. Description of the Prior Art

In the field of power source conversion, the use of a conversion circuit in current mode has been focused on outputting current from the conversion circuit to a load, such as so-called sourcing current. However, the one direction output of the above-mentioned conversion circuit cannot meet the needs of modern application circuits. Taking an application circuit of double data rate synchronous dynamic access memory (DDR SDRAM) as an example, the application circuit not only needs the current provided by a conversion circuit, but also needs the current received by the conversion circuit. More particularly, the output of the conversion circuit not only outputs current to the load formed by DDR SDRAM, but also inputs current from the load formed by DDR SDRAM. And, the current flowing from the load to the output of the conversion circuit is so-called sinking current.

As mentioned above, since the traditional conversion circuit in current mode only provides sourcing current but lacks of providing sinking current, the circuit cannot receive the current from the load when the load works in a sinking current mode. Perhaps, the circuit could receive the current from the load but has no the ability of voltage regulation. This situation would make the circuit burned-out or cause abnormal action. Moreover, the conversion circuit for integrating both sourcing and sinking current loads requires two sets of power source designs, one for positive and the other one for negative, so as to offer a positive or a negative referred voltage compared to corresponding feedback signals, respectively. However, the two sets of power source designs not only increase the layout areas in an integrated circuit (IC), but also raise the complexity of the circuit design.

In view of the drawbacks mentioned with the prior art of conversion circuit, there is a continued need to develop a new and improved circuit that overcomes the disadvantages associated with the prior art of conversion. The advantages of this invention are that it solves the problems mentioned above.

SUMMARY OF THE INVENTION

In accordance with the present invention, a conversion circuit for discriminating sourcing current and sinking current substantially obviates one or more of the problems resulted from the limitations and disadvantages of the prior art mentioned in the background.

The present invention integrates the conversion circuits of both sourcing current load and sinking current load into a single conversion circuit, and makes the single conversion circuit output a corresponding current through a mechanism of discriminating sourcing current and sinking current.

The present invention utilizes a complementary switch circuit to enable a corresponding switch circuit according to an inputted ON/OFF signal, so as to form a suitable output loop for sourcing current or sinking current.

The present invention employs a voltage emulating circuit to shift the feedback voltages of sourcing current and of sinking current to a suitable positive voltage range, so as to omit the negative power source design.

In accordance with the present invention, a conversion circuit for discriminating sourcing current and sinking current is disclosed. The conversion circuit includes a comparing circuit comparing an error-amplified signal with a converted feedback signal to output a compared result; a switch control logic circuit receiving the compared result and a clock signal to generate an ON/OFF signal, wherein the switch control logic circuit could timely blank the partial compared result in a sinking current mode to attain correct control signals; a complementary switch circuit enabling a corresponding switch circuit according to the ON/OFF signal, so as to form a serial loop with a sensor and an output load; a converting circuit converting the voltage of the sensor into a feedback current, wherein the enable of the converting circuit is controlled by the switch control logic circuit; and a voltage emulation circuit converting the feedback current into a feedback voltage and shifting the level of the feedback voltage to form the converted feedback signal.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Some embodiments of the invention will now be described in greater detail. Nevertheless, it should be noted that the present invention can be practiced in a wide range of other embodiments besides those explicitly described, and the scope of the present invention is expressly not limited except as specified in the accompanying claims.

Moreover, some irrelevant details are not drawn in order to make the illustrations concise and to provide a clear description for easily understanding the present invention.

Figure 1:
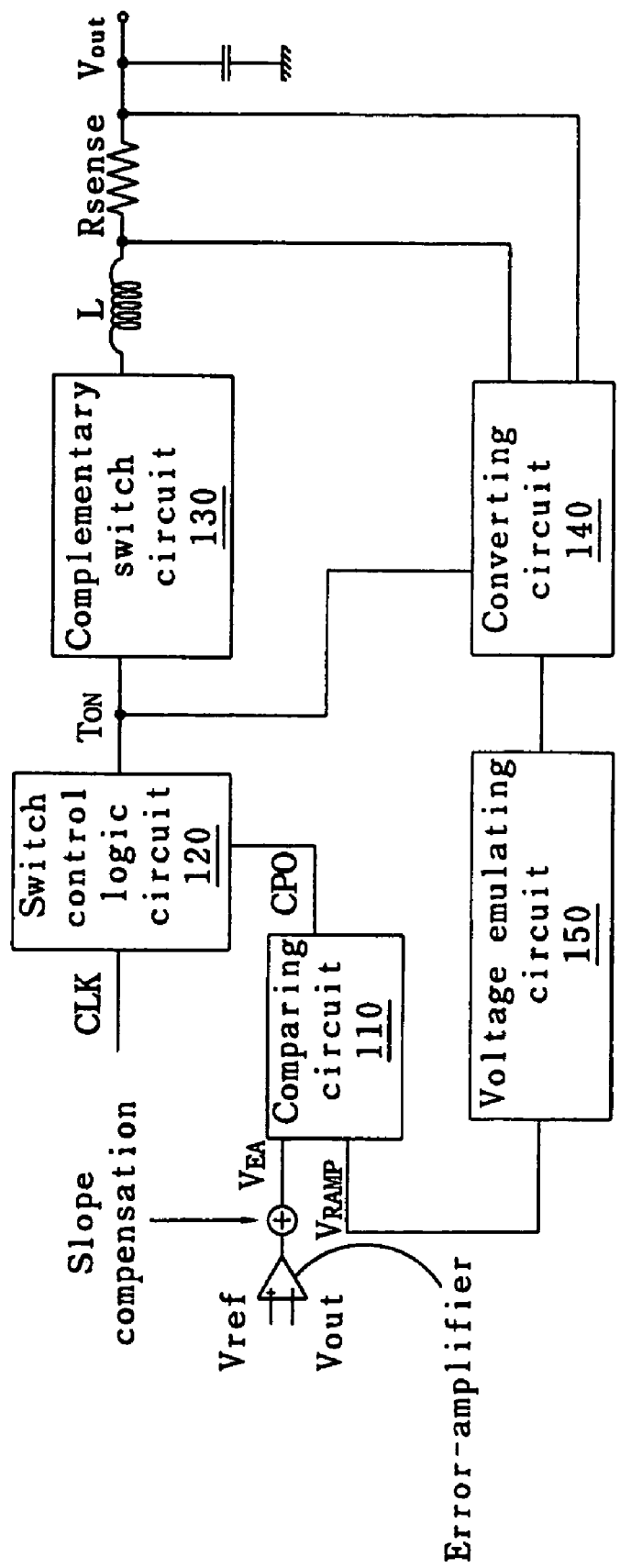
FIG. 1 illustrates a preferred embodiment circuit diagram in accordance with the present invention.

Referring to FIG. 1, a preferred embodiment circuit diagram in accordance with the present invention is illustrated. A comparing circuit 110 receives an error-amplified signal $V_{EA}$ and a converted feedback signal $V_{RAMP}$ to output a compared result CPO of the two signals. Herein, the error-amplified signal $V_{EA}$ is a compared result of a referred voltage and an output voltage, and the error-amplified signal $V_{EA}$ has slope compensation to make the loop stable when the duty cycle of the converted feedback signal $V_{RAMP}$ is bigger than 50%. A switch control logic circuit 120 receives the compared result CPO and a clock signal CLK to generate an ON/OFF signal $T_{ON}$. Herein, the switch control logic circuit 120 could timely blank the partial compared result CPO (detail descriptions later), so as to generate correct ON/OFF signal $T_{ON}$. A complementary switch circuit 130 enables a corresponding switch circuit according to the ON/OFF signal, so as to form a serial loop with a sensor and an output load. Herein, the sensor could be a resistor $R_{SENSE}$ and the output load could include a sourcing current load and a sinking current load. A converting circuit 140 converts a voltage of the sensor into a feedback current. Herein, the enable of the converting circuit 140 is controlled by the switch control logic circuit 120. A voltage emulation circuit 150 converts the feedback current into a feedback voltage and pulls up the level of the feedback voltage to form the converted feedback signal $V_{RAMP}$.

Figure 2:
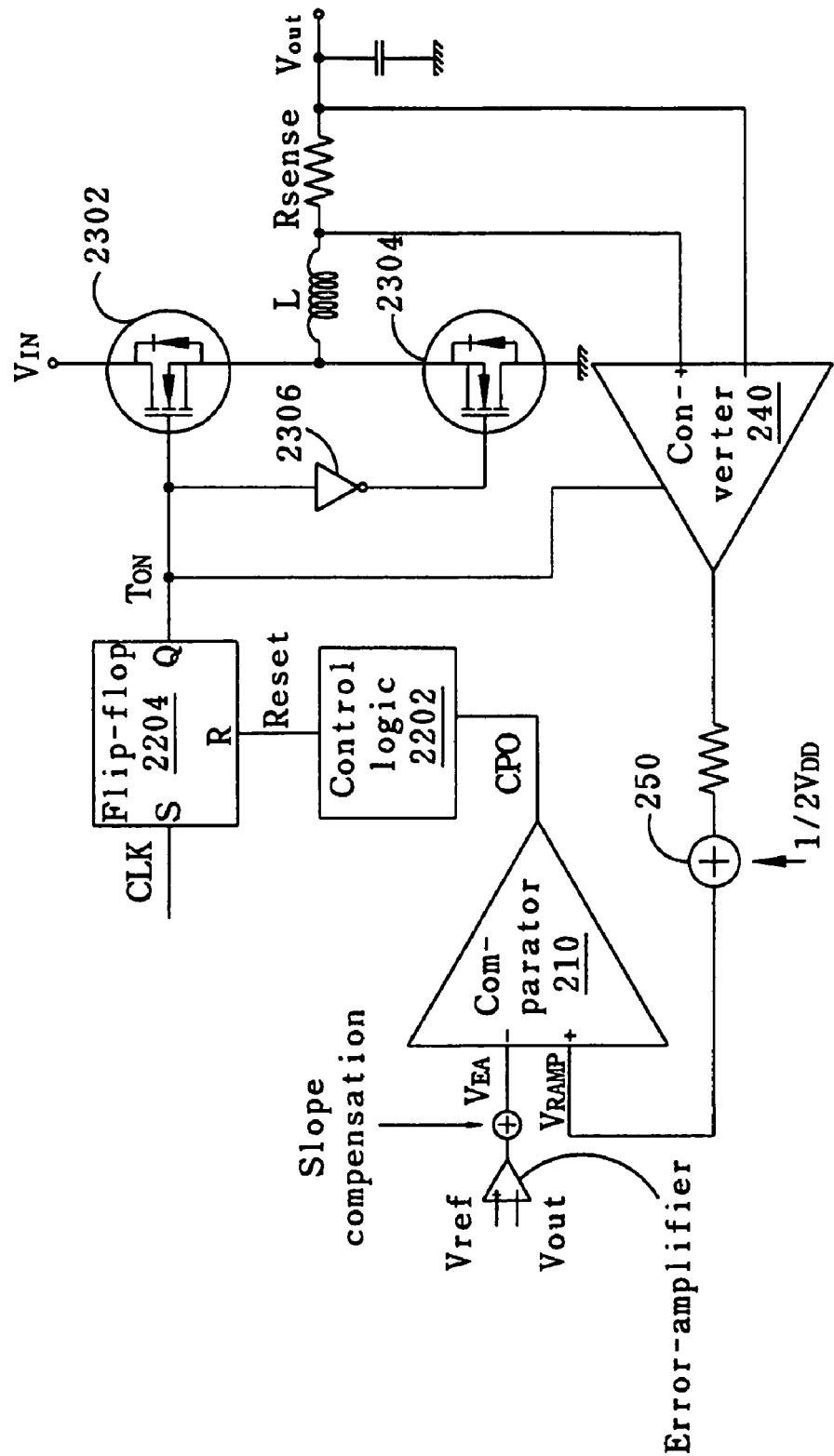
FIG. 2 illustrates one preferred embodiment circuit in FIG. 1.
Figure 3:
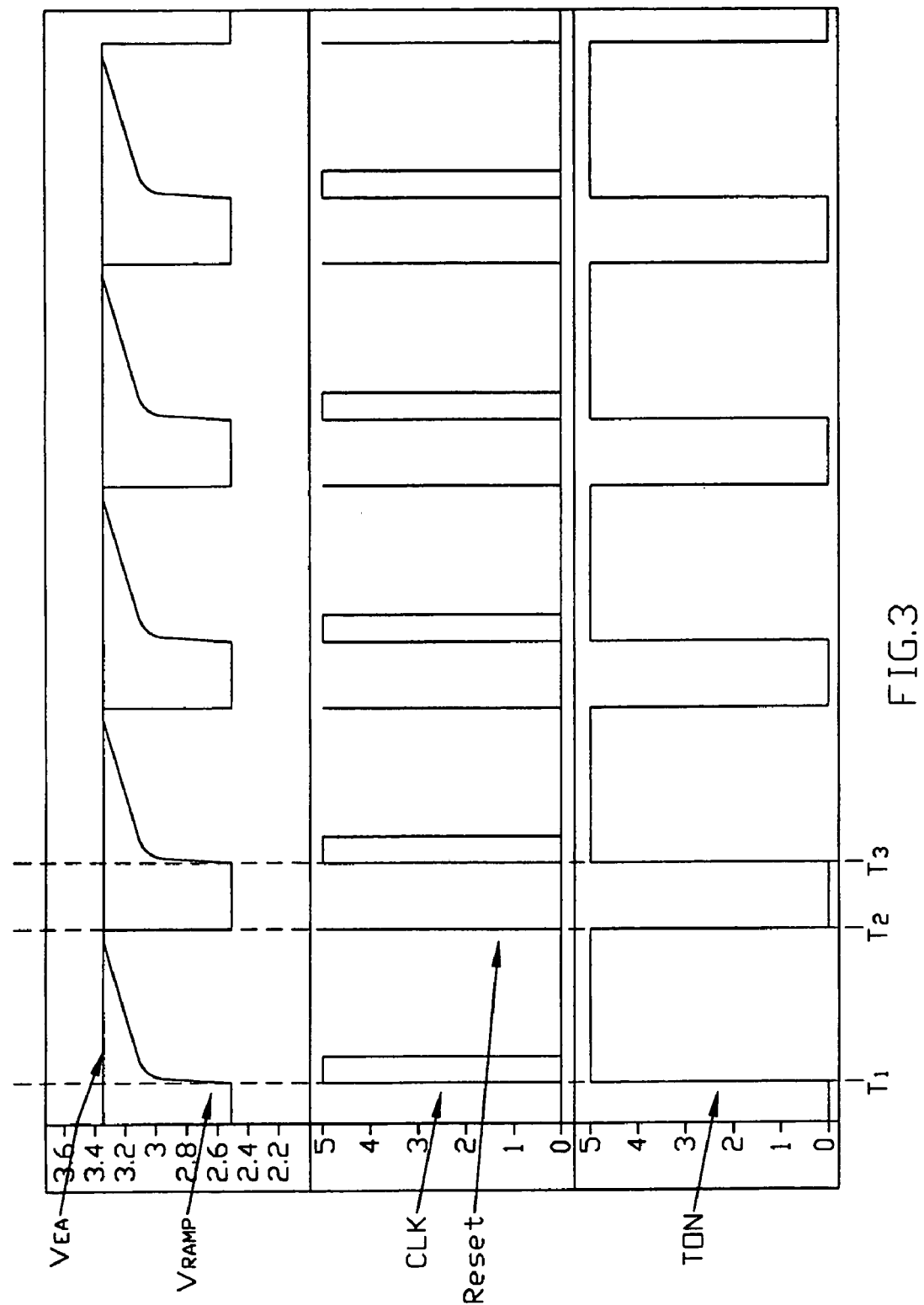
FIG. 3 shows waveforms of the circuit in FIG. 2 in the sourcing current output.
Figure 4:
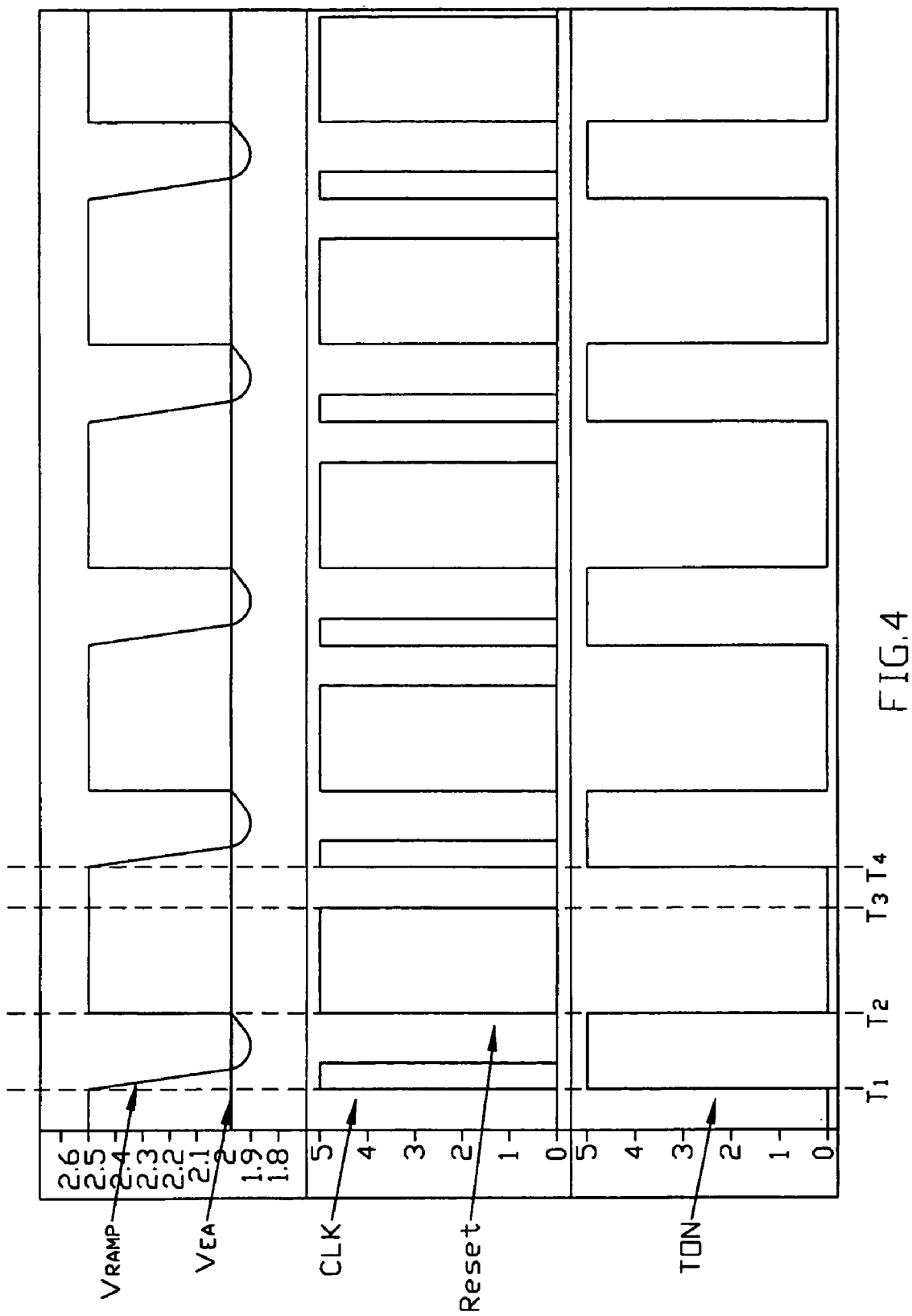
FIG. 4 shows waveforms of the circuit in FIG. 2 in the sinking current output.

Referring to FIGS. 2–4, one preferred embodiment circuit in FIG. 1 and waveforms of the circuit in FIG. 2 in the sourcing current output and sinking current output are respectively illustrated. A comparator 210 receives an error-amplified signal $V_{EA}$ from its negative (–) input and receives a converted feedback signal $V_{RAMP}$ from its positive (+) input. Accordingly, a compared resulted CPO is a low voltage output when the error-amplified signal $V_{EA}$ is bigger than the converted feedback signal $V_{RAMP}$; on the contrary, the compared resulted CPO is a high voltage output. Herein, the error-amplified signal $V_{EA}$ is a compared result of a referred voltage and an output voltage, and the error-amplified signal $V_{EA}$ has slope compensation to make the loop stable when the duty cycle of the converted feedback signal $V_{RAMP}$ is bigger than 50%. A control logic 2202 receives the compared result CPO from the comparator 210 and outputs a signal Reset. Herein, the control logic 2202 could timely blank the partial compared result CPO and this feature will be described later. A flip-flop 2204 receives a clock signal CLK by its S input and receives the signal Reset from the control logic 2202 by its R input. Thus, the flip-flop 2204 outputs a low voltage when the signal Reset is high-voltage triggered, and the flip-flop 2204 outputs a high voltage according to the triggering of the clock signal CLK when the signal Reset is a low voltage, so as to generate an ON/OFF signal TON. The switch control logic circuit in accordance with the present includes the above-mentioned control logic 2202 and the flip-flop 2204 but not limited in this combination.

As for the complementary switch circuit of this embodiment has MOS transistors 2302 and 2304, and an inverter 2306, but not limited in this combination. The source of the MOS transistor 2302 connects to the drain of the MOS transistor 2304 to form an output; the drain of the MOS transistor 2302 and the source of the MOS transistor 2304 respectively connect to a power source VIN and a signal ground; and the gate of the MOS transistor 2302 and the gate of the MOS transistor 2304 respectively connect to the input and the output of the inverter 2306. By doing so, when any ON/OFF signal $T_{ON}$ is inputted, a MOS transistor corresponding to the ON/OFF signal $T_{ON}$ is enabled (turn on) to form a corresponding current output loop. For example, the MOS transistor 2302, an inductor L and a resistor $R_{SENSE}$ form a sourcing current output loop when the MOS transistor 2302 is turned on; on the contrary, the MOS transistor 2304, the inductor L and the resistor $R_{SENSE}$ form a sinking current output loop when the MOS transistor 2304 is turned on. The inductor L and the resistor $R_{SENSE}$ connect to an output load (not drawn) in serial, herein the resistor $R_{SENSE}$ could be as a sensor to sense the current of the inductor L; the output load could include a sourcing current load and a sinking current load. A converter 240 converts the voltage of the resistor $R_{SENSE}$ into a feedback current, herein the converter 240 could be a voltage-current converter and its enable time is controlled by the above-mentioned switch control logic circuit (by the output of the flip-flop 2204). The voltage emulation circuit in this embodiment includes a resistor and an extra voltage point 250, herein the resistor translates the feedback current into a feedback voltage and the extra voltage point 250 pulls up the voltage level of the feedback voltage to form the converted feedback signal $V_{RAMP}$ by adding a DC voltage. The DC voltage is a suitable DC level defined by the designer, and the DC level is ½ power source voltage in this embodiment. Accordingly, the negative feedback voltage formed by the sinking current is shifted to a positive voltage, and in the meantime, the negative referred voltage can be replaced through a positive voltage. Thus, one power source design can satisfy with the present invention.

Referring to FIGS. 2 and 3, in time $T_1$, the signal Reset is a low voltage since the error-amplified signal $V_{EA}$ is bigger than the converted feedback signal $V_{RAMP}$ (that is, feedback output voltage smaller than referred voltage). When the clock signal CLK generates a pulse, the ON/OFF signal $T_{ON}$ outputs a high voltage to turn on the MOS transistor 2302 and simultaneously enables the voltage-current converter 240. In the meanwhile, the current from the power source $V_{IN}$ flows through the MOS transistor 2302, the inductor L and the resistor $R_{SENSE}$ to pull up the output voltage $V_{OUT}$, and the converted feedback signal $V_{RAMP}$ therefore increases. In time $T_2$, the signal Reset changes to a high voltage since the converted feedback signal $V_{RAMP}$ is bigger than the error-amplified signal $V_{EA}$ (that is, feedback output voltage bigger than referred voltage). This change makes the ON/OFF signal $T_{ON}$ outputs a low voltage to turn off the MOS transistor 2302 and simultaneously disables the voltage-current converter 240. In the meantime, the current produced by the back-EMF of the inductor L is reducing the output voltage $V_{OUT}$, and the converted feedback signal $V_{RAMP}$ is in a low voltage status due to the voltage-current converter 240 being inactive. In time $T_3$, the actions are the same as those described in time $T_1$.

Referring to FIGS. 2 and 4, in time $T_1$, when output is sinking, the compared result CPO outputted from the comparator 210 is blanked by the control logic 2202 to make the signal Reset be a low voltage, although the converted feedback signal $V_{RAMP}$ is bigger than the error-amplified signal $V_{EA}$ (that is, feedback output is sinking current). Then, when the signal CLK is on and the signal Reset is disabled because of the control logic 2202, the ON/OFF signal Ton outputs a high voltage since the R input of the flip-flop 2204 is 0. In the meanwhile, the current produced by the back-EMF of the inductor L is to pull up the output voltage $V_{OUT}$, and the converted feedback signal $V_{RAMP}$ therefore increases. In time $T_2$, the signal Reset changes to a high voltage since the converted feedback signal $V_{RAMP}$ is bigger than the error-amplified signal $V_{EA}$ (that is, feedback output voltage bigger than referred voltage). This change makes the ON/OFF signal TON outputs a low voltage to turn on the MOS transistor 2304 and simultaneously disables the voltage-current converter 240. In the meantime, the current from the output flows through the resistor $R_{SENSE}$, the inductor L and the MOS transistor 2304 to reduce the output voltage $V_{OUT}$, and the converted feedback signal $V_{RAMP}$ is in a high voltage status due to the voltage-current converter 240 being inactive.

One detail particularly, in time $T_3$, the signal Reset is in a low voltage status before the clock signal CLK generates next pulse or the converted feedback signal $V_{RAMP}$ is smaller than the error-amplified signal $V_{EA}$, so that the clock signal CLK inputted from the S input can therefore make the inverter 2204 to output a high voltage to generate a correct ON/OFF signal TON. In other words, the control logic 2202 needs to blank the compared result CPO inputted from the comparator 210 during the above-mention periods to make the output signal Reset remain in the low voltage status. This is the above-mention "timely blank the partial compared result". In time $T_4$, the actions are the same as those described in time $T_1$.

Although specific embodiments have been illustrated and described, it will be obvious to those skilled in the art that various modifications may be made without departing from what is intended to be limited solely by the appended claims.

What is claimed is:

1. A conversion circuit for discriminating sourcing current and sinking current, said conversion circuit comprising:
   a comparing circuit, comparing an error-amplified signal to a converted feedback signal and outputting a compared result;
   a switch control logic circuit, receiving said compared result and a clock signal and generating an ON/OFF signal, wherein said switch control logic circuit timely blanks said compared result;
   a complementary switch circuit, enabling a corresponding switch circuit according to said ON/OFF signal, so as to form a serial loop with a sensor and an output load;
   a converting circuit, converting a voltage of said sensor into a feedback current, wherein an enable time of said converting circuit is controlled by said switch control logic circuit; and
   a voltage emulation circuit, converting said feedback current into a feedback voltage and shifting a DC level of said feedback voltage to form said converted feedback signal.

2. The conversion circuit according to claim 1, wherein said error-amplified signal is required by comparing a referred voltage and an output voltage, and said error-amplified signal has slope compensation when the duty cycle of said converted feedback signal is bigger than 50%.

3. The conversion circuit according to claim 1, wherein said output load comprises a sourcing current load and/or a sinking current load.

4. The conversion circuit according to claim 1, when said serial loop is a sinking current output and said ON/OFF signal is in a low voltage status, said switch control logic circuit blanks said compared result by a next pulse of said clock signal.

5. The conversion circuit according to claim 1, when said serial loop is said sinking current output and said ON/OFF signal is in said low voltage status, said switch control logic circuit blanks said compared result before said converted feedback signal is smaller than said error-amplified signal.

6. The conversion circuit according to claim 1, wherein said enable time of said converting circuit is the same as an enable time of a corresponding switch circuit forming a sourcing current output loop.

7. The conversion circuit according to claim 1, wherein said DC level comprises ½ power source voltage.

8. A conversion circuit for discriminating sourcing current and sinking current, said conversion circuit comprising:
   a comparator, comparing an error-amplified signal to a converted feedback signal and outputting a compared result;
   a control logic, receiving said compared result and outputting a reset signal, wherein said control logic could timely blank said compared result;
   a flip-flop, receiving said reset signal and a clock signal and generating an ON/OFF signal;
   a complementary switch circuit, enabling a corresponding switch circuit according to said ON/OFF signal, so as to form a serial loop with a sensor and an output load;
   a voltage-current converter, converting a voltage of said sensor into a feedback current, wherein an enable time of said voltage-current converter is controlled by said flip-flop; and
   a voltage emulation circuit, converting said feedback current into a feedback voltage and adding a DC voltage to pull up said feedback voltage to form said converted feedback signal.

9. The conversion circuit according to claim 8, wherein said error-amplified signal is required by comparing a referred voltage and an output voltage, and said error-amplified signal has slope compensation when the duty cycle of said converted feedback signal is bigger than 50%.

10. The conversion circuit according to claim 8, wherein said compared result is a low voltage output when said error-amplified signal is bigger than said converted feedback signal, and said compared result is a high voltage output when said error-amplified signal is smaller than said converted feedback signal.

11. The conversion circuit according to claim 8, wherein said output load comprises a sourcing current load and/or a sinking current load.

12. The conversion circuit according to claim 8, when said serial loop is a sinking current output and said ON/OFF signal is in a low voltage status, said control logic blanks said compared result by a next pulse of said clock signal.

13. The conversion circuit according to claim 8, when said serial loop is said sinking current output and said ON/OFF signal is in said low voltage status, said control logic blanks said compared result before said converted feedback signal is smaller than said error-amplified signal.

14. The conversion circuit according to claim 8, wherein said flip-flop is an S-R flip-flop.

15. The conversion circuit according to claim 8, wherein said complementary switch circuit comprises:
   a first MOS transistor, wherein a drain of said first MOS transistor connects to a power source voltage;
   a second MOS transistor, wherein a drain of said second MOS transistor connects to a source of said first MOS transistor to form a output, and a source of said second MOS transistor connects to a signal ground; and
   an inverter, wherein an output of said inverter connects to a gate of said first MOS transistor, and an input of said inverter connects to a gate of said second MOS transistor.

16. The conversion circuit according to claim 15, wherein said enable time of said voltage-current converter is the same as an enable time of said first MOS transistor.

17. The conversion circuit according to claim 8, wherein said sensor comprises a resistor.

18. The conversion circuit according to claim 8, wherein said DC voltage comprises ½ said power source voltage.

* * * * *